United States Patent [19]

Arakawa et al.

[11] Patent Number: 4,534,884

[45] Date of Patent: Aug. 13, 1985

[54] PROCESS FOR THE PREPARATION OF PHOSPHOR

[75] Inventors: Satoshi Arakawa; Takashi Nakamura; Kenji Takahashi, all of Kaisei, Japan

[73] Assignee: Fuji Photo Film Co. Ltd., Kanagawa, Japan

[21] Appl. No.: 549,414

[22] Filed: Nov. 7, 1983

[30] Foreign Application Priority Data

Nov. 8, 1982 [JP] Japan .................................. 57-194696

[51] Int. Cl.$^3$ ............................................ C09K 11/465
[52] U.S. Cl. .............................................. 252/301.4 H
[58] Field of Search .................................. 252/301.4 H

[56] References Cited

U.S. PATENT DOCUMENTS 4,221,776  9/1980  Autzen et al. ...................... 423/634

Primary Examiner—Jack Cooper
Attorney, Agent, or Firm—Murray, Whisenhunt & Ferguson

[57] ABSTRACT

A process for the preparation of a phosphor comprising firing a mixture of starting materials for the phosphor under a reducing atmosphere, characterized in that said mixture of starting materials for the phosphor is impregnated with a liquid organic compound capable of producing carbon and/or carbon monoxide by thermal decomposition, and said reducing atmosphere is formed or reinforced by the carbon and/or carbon monoxide produced by the thermal decomposition of the liquid organic compound in the firing stage.

3 Claims, No Drawings

PROCESS FOR THE PREPARATION OF PHOSPHOR

BACKGROUND OF THE INVENTION

1. Field of the Invention

The present invention relates to a process for the preparation of a phosphor, and more particularly, to a process for the preparation of a phosphor comprising firing a mixture of starting materials for the phosphor under a reducing atmosphere.

2. Description of the Prior Art

There are known a variety of phosphors, and also known are various processes for the preparation of phosphors. A process for the preparation of a phosphor which comprises preparing a powdery mixture of starting materials for the phosphor by mixing and, if necessary, by subjecting the mixture to pulverization, and then firing the mixture of starting materials for the phosphor.

In the above-mentioned process for the preparation of a phosphor comprising firing a mixture of starting materials for the phosphor, the valence of an activator element contained therein is, in a certain case, reduced to the desired valence (to a lower valence than that for the activator element contained in the mixture of starting materials for the phosphor) in the firing procedure, for instance, as in the process for the preparation of a phosphor having a divalent europium as the activator. In such a case, the reduction of valence of the activator element is accomplished by carrying out the firing of the mixture of starting materials for the phosphor under a reducing atmosphere.

When a mixture of starting materials for a phosphor is fired under a reducing atmosphere as in the above-described case, the reducing atmosphere can be formed by introducing a reducing gas such as gaseous carbon dioxide containing carbon monoxide (CO) or gaseous nitrogen containing hydrogen ($H_2$) into a firing system such as a firing furnace. Accordingly, the reduction of the activator element contained in the mixture of starting materials for the phosphor is carried out by action of CO or $H_2$ introduced into the firing system. In this reduction method, however, there occurs such a problem that uniform reduction of the activator element can be hardly accomplished in the firing system. More in detail, the activator element present on the surface of the powdery mixture of the starting materials can be reduced rapidly upon direct contact with the reducing gas, while the activator element present inside of the mixture of the starting materials cannot be easily reduced. Accordingly, the reduction of the activator element is likely made ununiform.

Also known is a method utilizing powdery carbon (C) as a reducing agent for providing a reducing atmosphere to the firing system. This method is carried out, for instance, by placing the powdery carbon on a mixture of starting materials for a phosphor charged in a container for firing and then submitting them to the firing. After the firing is complete, the residual carbon in the container is separated and removed from the resulting phosphor. However, even in this method, a portion of the activator element being present out of contact with carbon, for instance, a portion of the activator element placed in the bottom of the container, cannot be sufficiently reduced. In order to avoid such ununiform reduction of the activator element, there can be offered a method involving sufficiently mixing the powdery carbon with the mixture of the starting materials prior to the firing thereof. However, in this case, it is difficult to separate the residual carbon from the resulting phosphor after the firing and, as a result, such a problem that a considerable amount of carbon is likely incorporated into the phosphor as impurity arises.

Accordingly, in the above-described conventional methods of firing and reducing a mixture of starting materials for a phosphor containing an activator element, it is difficult to obtain a phosphor which gives emission of sufficiently high luminance and/or shows a emission color of high purity, because the reduction of the activator element is ununiform or the impurities are present in the resulting phosphor.

As a method to solve the problems occurring in the conventional firing and reducing methods as described above, Japanese Patent Provisional Publication No. 57(1982)-67682 discloses a method of adding to the starting materials for a phosphor an organic compound decomposable in the firing procedure to produce a gas containing a reducing gas, in place of a method of introducing a reducing gas into a firing furnace. In the above publication, oxalic acid and dimethyl oxalate are mentioned as the organic compounds employable in the method and also mentioned are procedures of mixing the organic compound with dry starting materials for a phosphor under dry conditions by means of a mixing apparatus such as ball mill.

However, since the starting materials for a phosphor are mixed with a solid organic compound such as oxalic acid or dimethyl oxalate in the above-mentioned method, a sufficiently uniform mixture can be hardly obtained. Even if a sufficiently uniform mixture of these dry solid materials is obtained, still the activator element positioned on the surface of the powdery starting materials only is in direct contact with the solid organic compound serving as a reducing agent. As a result, it is difficult to achieve uniform reduction of the activator element. Further, if the organic compound as described above is employed, carbonaceous product produced by thermal decomposition thereof likely remain in the resulting phosphor. Therefore, even in this method, it is difficult to obtain a phosphor satisfactorily improved in the luminance of emission.

SUMMARY OF THE INVENTION

The present invention provides an improvement in a process for the preparation of a phosphor comprising firing a mixture of starting materials for a phosphor under a reducing atmosphere. The object of the invention is to provide a process for the preparation of a phosphor enhanced in the emission luminance.

The object is accomplished by a process for the preparation of a phosphor of the present invention comprising firing a mixture of starting materials for the phosphor under a reducing atmosphere, characterized in that said mixture of starting materials for the phosphor is impregnated with a liquid organic compound thermally decomposable to produce both or either of carbon and carbon monoxide, and said reducing atmosphere is formed or reinforced by both or either of carbon and carbon monoxide produced by the thermal decomposition of the liquid organic compound in the firing stage.

The present invention is characterized in that carbon and/or carbon monoxide produced by thermal decomposition of a liquid organic compound with which the mixture of starting materials for a phosphor is beforehand impregnated is utilized as a reducing agent in the firing and reducing stage.

According to the invention, the liquid organic compound beforehand impregnated into the mixture of starting materials for a phosphor is thermally decomposed on heating in the firing stage to produce carbon and/or carbon monoxide. The carbon and/or carbon monoxide serves as the reducing agent. Since the organic compounds are liquid, they can permeate inside the powdery mixture of starting materials for a phosphor. Accordingly, the reduction of the inner portion of powdery mixture of starting materials for a phosphor, which is unsatisfactorily performed in the conventional firing and reducing procedures, proceeds easily and rapidly.

Further, the liquid organic compound is generally decomposed easily on heating in the firing stage, and even an extremely small amount of the liquid organic compound in the mixture of starting materials for a phosphor can form a reducing atmosphere in the firing stage. Furthermore, the liquid organic compound brings about no substantial decrease in the purity of the resulting phosphor, because the liquid organic compound in the mixture of the starting materials does not produce an imcomplete decomposition product or residual carbon in the firing stage.

Accordingly, a phosphor obtained in the process of the present invention shows satisfactory characteristics such as enhancement in the luminance of emission and enhancement in purity of the emission color.

DETAILED DESCRIPTION OF THE INVENTION

The process for the preparation of a phosphor of the present invention is applicable to any phosphor, as far as the phosphor can be prepared by the procedures of preparing a mixture of starting materials for the phosphor and then firing the mixture under a reducing atmosphere. For instance, the process for the preparation of a phosphor of the invention is suitable for the preparation of a phosphor containing a divalent europium as an activator such as a divalent europium activated alkaline earth metal fluorohalide phosphor. When this phosphor is prepared according to the invention, particularly remarkable result is obtained.

Examples of the divalent europium activated alkaline earth metal fluorohalide phosphor include the following phosphors:

(I) $(Ba_{1-x-y},Mg_x,Ca_y)FX:aEu^{2+}$, in which $X$ is at least one element selected from the group consisting of Cl and Br; $x$ and $y$ are numbers satisfying the conditions of $0<x+y\leq 0.6$, and $xy\neq 0$; and $a$ is a number satisfying the condition of $10^{-6}\leq a\leq 5\times 10^{-2}$, as described in Japanese Patent Provisional Publication No. 55(1980)-12143;

(II) $(Ba_{1-x},M^{II}_x)FX:yEu^{2+}$, in which $M^{II}$ is at least one element selected from the group consisting of Mg, Ca, Sr, Zn and Cd; $X$ is at least one element selected from the group consisting of Cl, Br and I; and $x$ and $y$ are numbers satisfying the conditions of $0\leq x\leq 0.6$ and $0<y\leq 0.2$, respectively, as described in Japanese Patent Provisional Publication No. 55(1980)-12145;

(III) $M^{II}FX.xA:yEu^{2+}$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; $X$ is at least one element selected from the group consisting of Cl, Br and I; and $x$ and $y$ are numbers satisfying the conditions of $5\times 10^{-5}\leq x\leq 0.5$ and $0<y\leq 0.2$, respectively, as described in Japanese Patent Provisional Publication No. 55(1980)-160078;

(IV) $(Ba_{1-x},M^{II}_x)F_2.aBaX_2:yEu^{2+},zA$, in which $M^{II}$ is at least one element selected from the group consisting of Be, Mg, Ca, Sr, Zn and Cd; $X$ is at least one element selected from the group consisting of Cl, Br and I; A is at least one element selected from the group consisting of Zr and Sc; and $a$, $x$, $y$ and $z$ are numbers satisfying the conditions of $0.5\leq a\leq 1.25$, $0\leq x\leq 1$, $10^{-6}\leq y\leq 2\times 10^{-1}$, and $0<z\leq 10^{-2}$, respectively, as described in Japanese Patent Provisional Publication No. 56(1981)-116777;

(V) $(Ba_{1-x},M^{II}_x)F_2.aBaX_2:yEu^{2+},zB$, in which $M^{II}$ is at least one element selected from the group consisting of Be, Mg, Ca, Sr, Zn and Cd; $X$ is at least one element selected from the group consisting of Cl, Br and I; and $a$, $x$, $y$ and $z$ are numbers satisfying the conditions of $0.5\leq a\leq 1.25$, $0\leq x\leq 1$, $10^{-6}\leq y\leq 2\times 10^{-1}$, and $0<z\leq 2\times 10^{-1}$, respectively, as described in Japanese Patent Provisional Publication No. 57(1982)-23673;

(VI) $(Ba_{1-x},M^{II}_x)F_2.aBaX_2:yEu^{2+},zA$, in which $M^{II}$ is at least one element selected from the group consisting of Be, Mg, Ca, Sr, Zn and Cd; $X$ is at least one element selected from the group consisting of Cl, Br and I; A is at least one element selected from the group consisting of As and Si; and $a$, $x$, $y$ and $z$ are numbers satisfying the conditions of $0.5\leq a\leq 1.25$, $0\leq x\leq 1$, $10^{-6}\leq y\leq 2\times 10^{-1}$, and $0<z\leq 5\times 10^{-1}$, respectively, as described in Japanese Patent Provisional Publication No. 57(1982)-23675;

(VII) $Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; $X$ is at least one halogen selected from the group consisting of Cl, Br and I; and $x$ and $y$ are numbers satisfying the conditions of $10^{-2}\leq x\leq 0.5$ and $0<y\leq 0.1$, respectively, as described in Japanese Patent Application No. 57(1982)-89875 filed by the assignee of the present application;

(VIII) $BaFX.xA:yEu^{2+}$, in which $X$ is at least one halogen selected from the group consisting of Cl, Br and I; A is at least one fired product of a tetrafluoro boric acid compound; and $x$ and $y$ are numbers satisfying the conditions of $10^{-6}\leq x\leq 0.1$ and $0<y\leq 0.1$, respectively, as described in Japanese Patent Application No. 57(1982)-137374 filed by the assignee of the present application;

(IX) $BaFX.xA:yEu^{2+}$, in which $X$ is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and $x$ and $y$ are numbers satisfying the conditions of $10^{-6}\leq x\leq 0.1$ and $0<y\leq 0.1$, respectively, as described in Japanese Patent Application No. 57(1982)-158048 filed by the assignee of the present application;

(X) $BaFX.xNaX':aEu^{2+}$, in which each of $X$ and $X'$ is at least one halogen selected from the group consisting of Cl, Br and I; and $x$ and $a$ are numbers satisfying the conditions of $0<x\leq 2$ and $0<a\leq 0.2$, respectively, as described in Japanese Patent Application No.

57(1982)-166320 filed by the assignee of the present application.

(XI) $M^{II}FX \cdot xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively, as described in Japanese Patent Application No. 57(1982)-166696 filed by the assignee of the present application; and (XII) $M^{II}FX \cdot aM^{I}X' \cdot bM'^{II}X''_2 \cdot cM^{III}X'''_3 \cdot xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X" and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a + b + c \geq 10^{-6}$; and x and y are numbers satisfying the conditions of $0 < x \leq 0.5$ and $0 < y \leq 0.2$, respectively, as described in Japanese Patent Application No. 57(1982)-184455 by the assignee of the present application.

The above-mentioned divalent europium activated alkaline earth metal fluorohalide phosphors absorb a radiation such as X-rays with high efficiency and, when exposed to such a radiation, emit near ultraviolet to blue light of high luminance (spontaneous emission). Accordingly, said phosphors are satisfactorily employable in a radiographic intensifying screen used in medical radiography for medical diagnosis and in industrial radiography for nondestructive inspection.

Further, the divalent europium activated alkaline earth metal fluorohalide phosphors can be employed as a stimulable phosphor. That is, when exposed to a radiation such as X-rays, the phosphors absorb and store a portion of the radiation energy and emit near ultraviolet to blue light when excited with an electromagnetic wave within a wavelength region of 400–850 nm after exposure to the radiation. This emission is called "stimulated emission". Because of the stimulability thereof, the divalent europium activated alkaline earth metal fluorohalide phosphors have been paid much attention and investigated as a phosphor of a radiation image storage panel employable in a radiation image recording and reproducing method utilizing a stimulable phosphor.

The process for the preparation of a phosphor of the present invention is described below referring to the above-mentioned phosphor (II), which is one of the divalent europium activated alkaline earth metal fluorohalide phosphors.

The phosphor can be prepared using the following materials (1) to (4):

(1) $BaF_2$ (barium fluoride);

(2) at least one barium halide selected from the group consisting of $BaCl_2$, $BaBr_2$ and $BaI_2$, (3) at least one divalent metal halide selected from group consisting of $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $ZnF_2$, $ZnCl_2$, $ZnBr_2$, $ZnI_2$, $CdF_2$, $CdCl_2$, $CdBr_2$, and $CdI_2$; and (4) a trivalent europium compound such as europium halide, europium oxide, europium nitrate or europium sulfate.

An ammonium halide ($NH_4X'$, in which X' is F, Cl, Br or I) can be employed as a flux, if desired.

The above-mentioned starting materials are mixed in the stoichiometric ratio corresponding to the formula:

$$(Ba_{1-x}, M^{II}_x)FX:yEu$$

in which $M^{II}$ is at least one divalent metal selected from the group consisting of Mg, Ca, Sr, Zn and Cd; X is at least one halogen selected from the group consisting of Cl, Br and I; and x and y are numbers satisfying the conditions of $0 \leq x \leq 0.6$ and $0 < y \leq 0.2$, respectively.

The mixture for the preparation of the phosphor may be prepared by any one of the following methods:

(i) simply mixing the above starting materials (1) through (4);

(ii) mixing the above starting materials (1) through (3), heating the mixture at a temperature of not less than 100° C. for several hours to produce $M^{II}FX$, and then adding to the $M^{II}FX$ the above starting material (4); and (iii) mixing the above starting materials (1) through (3) in the form of a suspension, drying the suspension under heating (preferably at a temperature of 50°–200° C.) by a drying procedure such as drying under reduced pressure, vacuum drying to produce $M^{II}FX$, and then adding to the $M^{II}FX$ the above starting material (4).

As a modification of the above-described method (ii), there can be employed a method comprising procedures of mixing the starting materials (1) through (4), and subjecting the mixture to the above-mentioned heating processing. As a modification of the above-described method (iii), there can be employed a method comprising procedures of mixing the starting materials (1) through (4) in the form of a suspension and drying the suspension and drying the suspension.

In any one of the above-described methods (i), (ii), (iii) and other methods, the mixing procedure is carried out using a conventional mixing apparatus such as a variety of mixers, V-type blender, ball mill and rod mill.

Subsequently, thus prepared mixture of the starting materials for the phosphor is impregnated with a liquid organic compound which is to produce carbon and/or carbon monoxide by thermal decomposition.

The liquid organic compounds employable in the present invention are in a liquid state at a room temperature or in the vicinity thereof (not more than 50° C.) and under an atmospheric pressure. Preferred is an organic compound containing no other atoms than carbon atom, hydrogen atom and oxygen atom. Examples of the organic compound employable in the invention include alcohols such as methanol, ethanol, n-propanol, isopropanol, butanol, pentanol and hexanol: phenols such as phenol and cresol; aldehydes such as acetaldehyde and propionaldehyde; ketones such as acetone, methyl ethyl ketone, diethyl ketone and methyl isobutyl ketone, ethers such as dimethyl ether, methyl ethyl ether and diethyl ether; carboxylic acids such as formic acid, acetic acid, propionic acid and butyric acid; esters such as methyl acetate, ethyl acetate, propyl acetate, isopropyl acetate, butyl acetate, methyl propionate and ethyl propionate; hydroperoxides such as methyl hydroperoxide, ethyl hydroperoxide and propyl hydroperoxide; and mixtures thereof.

The above-mentioned liquid organic compounds can be easily decomposed to produce reducing substances such as carbon and carbon monoxide on heating in the firing stage (at the firing temperature of 600°–1000° C.), and easily oxidized to become a gaseous product such as carbon monoxide or carbon dioxide, which escapes spontaneously from the fired mixture.

In the present invention, there is no specific limitation on the method for impregnating the liquid organic compound into a mixture of starting materials for a phosphor. However, in order to cause efficient permeation of the liquid organic compound into the inner portion of the mixture of the starting materials in the form of cake or powder, preferably employed is a method of introducing the mixture of starting materials for the phosphor into the liquid organic compound or a solution of the liquid organic compound diluted with an appropriate solvent, whereby to perform the desired impregnation of the mixture with the liquid organic compound in the suspension.

Thus prepared suspension of the mixture of starting materials for the phosphor can be subjected as such to a firing stage, but it is preferred that the suspension is subjected to a procedure such as filtration or evaporation of the solvent prior to the firing stage, so as to remove excessive liquid organic compound and/or solvent. The liquid organic compound is desirable to be incorporated into the mixture of starting materials for the phosphor in such an amount that when the liquid organic compound is decomposed on heating in the firing stage, it can provide a reducing atmosphere to the mixture in which the aimed reduction reaction such as reduction reaction of an activator element can be sufficiently carried out.

The impregnation of the mixture of starting materials for a phosphor with the liquid organic compound is not necessarily carried out after the preparation of the mixture. The mixture of the starting materials impregnated with the liquid organic compound can be also obtained by immersing a portion of the starting materials in the above-mentioned liquid, followed by drying or the like if desired, and then adding the remaining starting materials thereto. For example, the following procedures can be employed in the above-described method (ii) or (iii) for the preparation of the mixture of starting materials for the phosphor: the resulting $M^{II}FX$ is initially immersed in the liquid organic compound, the excessive liquid is removed therefrom, and the aforementioned starting material (4) is then mixed therewith.

The mixture of starting materials for the phosphor impregnated with the liquid organic compound prepared as described above is then placed in a heat-resistant container such as a quartz boat, an alumina crucible or a quartz crucible and fired in an electric furnace. The firing temperature suitably ranges from 600°–1000° C. The firing period is determined depending upon the amount of the mixture of starting materials, the firing temperature, etc., and generally ranges from 0.5 to 12 hours, preferably from 0.5 to 5 hours.

The firing procedure is carried out under an atmosphere having substantially no reducing power such as ambient air, or a weak reducing atmosphere employed in the conventional firing and reducing procedure such as a nitrogen gas atmosphere containing a small amount of a hydrogen gas or a carbon dioxide gas atmosphere containing carbon monoxide gas. More in detail, the liquid organic compound incorporated into the mixture of starting materials for the phosphor is decomposed on heating in the firing stage to produce a reducing substance such as carbon or carbon monoxide, and the so produced carbon or carbon monoxide reduces the trivalent europium into the divalent europium which serves as an activator of the phosphor in this example.

After firing the mixture of starting materials for the phosphor as described above, the fired product is taken out of the electric furnace, allowed to stand for cooling and pulverized. The pulverizing procedure is done using a conventional pulverizing apparatus such as a mortar, ball mill, tube mill or a centrifugal mill. The firing procedure can be carried out two or more times by a method of placing the pulverized product in the heat-resistant container and firing again in the electric furnace. In advance of the second firing procedure, an additive such as a metal oxide may be added to the product, if desired. In the second firing, the firing temperature suitably ranges from 500° to 800° C. and the firing period suitably ranges from 0.5 to 12 hours, and preferably ranges from 0.5 to 5 hours. As the firing atmosphere in the second firing, there can be employed an inert atmosphere such as a nitrogen gas atmosphere or an argon gas atmosphere, as well as the above-mentioned weak reducing atmosphere. The obtained phosphor may be processed in a conventional manner involving a variety of procedures for the preparation of phosphors such as a washing procedure, a drying procedure and a sieving procedure.

The phosphor prepared in the above-described embodiment is the aforementioned phosphor (II), that is, a divalent europium activated alkaline earth metal fluorohalide phosphor having the formula:

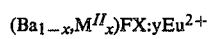

$(Ba_{1-x}M^{II}_x)FX:yEu^{2+}$ in which $M^{II}$ is at least one divalent metal selected from the group consisting of Mg, Ca, Sr, Zn and Cd; X is at least one halogen selected from the group consisting of Cl, Br and I; and x and y are numbers satisfying the conditions of $0 \leq x \leq 0.6$ and $0 < y \leq 0.2$, respectively.

The process for the preparation of a phosphor of the present invention is described hereinbefore by an example of the process for the preparation of the divalent europium activated alkaline earth metal fluorohalide phosphor, but is by no means restricted to the above-mentioned phosphor. Any other phosphor prepared by firing under a reducing atmosphere can be enhanced in the emission luminance (luminance of spontaneous emission and luminance of stimulated emission) and in the purity of emission color, by subjecting the starting materials for the phosphor to impregnation with a liquid organic compound which easily decomposes thermally to produce carbon and/or carbon monoxide and then firing thus treated materials.

The present invention will be illustrated by the following examples, but these examples by no means restrict the invention.

EXAMPLE 1

To 300 ml. of distilled water ($H_2O$) were added 175.4 g. of barium fluoride ($BaF_2$), 333.2 g. of barium bromide ($BaBr_2 \cdot 2H_2O$) and 0.783 g. of europium bromide ($EuBr_3$), and they were mixed to give a suspension. The suspension was dried at 60° C. under reduced pressure for 3 hours and further dried at 150° C. under vacuum for another 3 hours.

Thus obtained dry product (mixture of starting materials for phosphor) was then immersed in 300 ml. of acetaldehyde (CH₃CHO) under stirring. The suspension was dried at 120° C. under vacuum for 1 hour to obtain a mixture of starting materials for phosphor impregnated with acetaldehyde.

Then, the mixture of the starting materials impregnated with acetaldehyde was finely pulverized. The so pulverized mixture was placed in an alumina crucible, which was, in turn, placed in a high-temperature electric furnace for firing. The firing was done at 800° C. in air for 2 hours. After the firing was complete, the crucible was taken out of the furnace and allowed to stand for cooling. The fired product was pulverized to obtain a powdery divalent europium activated barium fluorobromide phosphor (BaFBr:0.001Eu$^{2+}$).

EXAMPLE 2

A powdery divalent europium activated barium fluorobromide phosphor (BaFBr:0.001Eu$^{2+}$) was obtained in the same manner as described in Example 1 except that propionaldehyde (C$_2$H$_5$CHO) was employed instead of acetaldehyde to prepare a mixture of starting materials for the phosphor impregnated with propionaldehyde.

EXAMPLE 3

A powdery divalent europium activated barium fluorobromide phosphor (BaFBr:0.001Eu$^{2+}$) was obtained in the same manner as described in Example 1 except that acetone (CH$_3$COCH$_3$) was employed instead of acetaldehyde to prepare a mixture of starting materials for the phosphor impregnated with acetone.

EXAMPLE 4

A powdery divalent europium activated barium fluorobromide phosphor (BaFBr:0.001Eu$^{2+}$) was obtained in the same manner as described in Example 1 except that methanol (CH$_3$OH) was employed instead of acetaldehyde to prepare a mixture of starting materials for the phosphor impregnated with methanol.

EXAMPLE 5

A powdery divalent europium activated barium fluorobromide phosphor (BaFBr:0.001Eu$^{2+}$) was obtained in the same manner as described in Example 1 except that ethanol (C$_2$H$_5$OH) was employed instead of acetaldehyde to prepare a mixture of starting materials for the phosphor impregnated with ethanol.

EXAMPLE 6

A powdery divalent europium activated barium fluorobromide phosphor (BaFBr:0.001Eu$^{2+}$) was obtained in the same manner as described in Example 1 except that butanol (C$_4$H$_9$OH) was employed instead of acetaldehyde to prepare a mixture of starting materials for the phosphor impregnated with butanol.

EXAMPLE 7

A powdery divalent europium activated barium fluorobromide phosphor (BaFBr:0.001Eu$^{2+}$) was obtained in the same manner as described in Example 1 except that phenol (C$_6$H$_5$OH) was employed instead of acetaldehyde to prepare a mixture of starting materials for the phosphor impregnated with phenol.

EXAMPLE 8

A powdery divalent europium activated barium fluorobromide phosphor (BaFBr:0.001Eu$^{2+}$) was obtained in the same manner as described in Example 1 except that acetic acid (CH$_3$COOH) was employed instead of acetaldehyde to prepare a mixture of starting materials for the phosphor impregnated with acetic acid.

EXAMPLE 9

A powdery divalent europium activated barium fluorobromide phosphor (BaFBr:0.001Eu$^{2+}$) was obtained in the same manner as described in Example 1 except that methyl acetate (CH$_3$COOCH$_3$) was employed instead of acetaldehyde to prepare a mixture of starting materials for the phosphor impregnated with methyl acetate.

EXAMPLE 10

A powdery divalent europium activated barium fluorobromide phosphor (BaFBr:0.001Eu$^{2+}$) was obtained in the same manner as described in Example 1 except that methyl propionate (C$_2$H$_5$COOCH$_3$) was employed instead of acetaldehyde to prepare a mixture of starting materials for the phosphor impregnated with methyl propionate.

EXAMPLE 11

A powdery divalent europium activated barium fluorobromide phosphor (BaFBr:0.001Eu$^{2+}$) was obtained in the same manner as described in Example 1 except that dimethyl ether (CH$_3$OCH$_3$) was employed instead of acetaldehyde to prepare a mixture of starting materials for the phosphor impregnated with dimethyl ether.

EXAMPLE 12

A powdery divalent europium activated barium fluorobromide phosphor (BaFBr:0.001Eu$^{2+}$) was obtained in the same manner as described in Example 1 except that methyl ethyl ether (CH$_3$OC$_2$H$_5$) was employed instead of acetaldehyde to prepare a mixture of starting materials for the phosphor impregnated with methyl ethyl ether.

EXAMPLE 13

A powdery divalent europium activated barium fluorobromide phosphor (BaFBr:0.001Eu$^{2+}$) was obtained in the same manner as described in Example 1 except that isopropyl hydroperoxide [(CH$_3$)$_2$CHOOH] was employed instead of acetaldehyde to prepare a mixture of starting materials for the phosphor impregnated with isopropyl hydroperoxide.

COMPARISON EXAMPLE 1

The dried mixture of starting materials for a phosphor prepared in Example 1 was finely pulverized without subjecting to the impregnation with acetaldehyde.

The so pulverized mixture was placed in an alumina crucible, which was, in turn, placed in a high-temperature electric furnace for firing. The firing was done at 800° C. in air for 2 hours. After the firing was complete, the crucible was taken out of the furnace and allowed to stand for cooling. The fired product was pulverized to obtain a powdery divalent europium activated barium fluorobromide phosphor (BaFBr:0.001Eu$^{2+}$).

The phosphors prepared in Examples 1 through 13 and Comparison Example 1 were measured on the luminance of stimulated emission when excited with a He-Ne laser (oscillation wavelength: 632.8 nm) after exposure to X-rays at the voltage of 80 KVp, to evaluated the luminance of stimulated emission thereof.

The results on the evaluation of the phosphors are set forth in Table 1.

TABLE 1

|  |  | Liquid for Impregnation | Relative Luminance |
| --- | --- | --- | --- |
| Example | 1 | $CH_3CHO$ | 108 |
|  | 2 | $C_2H_5CHO$ | 105 |
|  | 3 | $CH_3COCH_3$ | 118 |
|  | 4 | $CH_3OH$ | 108 |
|  | 5 | $C_2H_5OH$ | 110 |
|  | 6 | $C_4H_9OH$ | 110 |
|  | 7 | $C_6H_5OH$ | 105 |
|  | 8 | $CH_3COOH$ | 106 |
|  | 9 | $CH_3COOCH_3$ | 115 |
|  | 10 | $C_2H_5COOCH_3$ | 110 |
|  | 11 | $CH_3OCH_3$ | 110 |
|  | 12 | $CH_3OC_2H_5$ | 118 |
|  | 13 | $(CH_3)_2CHOOH$ | 120 |
| Com. Example | 1 | None | 100 |

We claim:

1. A process for the preparation of a divalent europium activated alkaline earth metal fluorohalide phosphor enhanced in emission luminance comprising firing a mixture of starting materials for the phosphor under a reducing atmosphere at 600° to 1,000° C., characterized in that said mixture of starting materials for the phosphor is impregnated with a liquid organic compound thermally decomposable to produce both or either of carbon and carbon monoxide, and said reducing atmosphere is formed or reinforced by both or either of carbon and carbon monoxide produced by the thermal decomposition of the liquid organic compound in the firing stage.

2. The process for the preparation of a phosphor as claimed in claim 1, in which the liquid organic compound is selected from the group consisting of methanol, ethanol, n-propanol, isopropanol, butanol, pentanol, hexanol, phenol, cresol, acetaldehyde, propionaldehyde, acetone, methyl ethyl ketone, diethyl ketone, methyl isobutyl ketone, dimethyl ether, methyl ethyl ether, diethyl ether, formic acid, acetic acid, propionic acid, butyric acid, methyl acetate, ethyl acetate, propyl acetate, isopropyl acetate, butyl acetate, methyl propionate, ethyl propionate, methyl hydroperoxide, ethyl hydroperoxide and propyl hydroperoxide; and mixtures thereof.

3. A process for the preparation of a divalent europium activated alkaline earth metal fluorohalide phosphor enhanced in emission luminance comprising firing a mixture starting of materials for the phosphor under a reducing atmosphere at 600° to 1,000° C., characterized in that said mixture of starting materials for the phosphor is impregnated with a liquid organic compound thermally decomposable at 600° to 1000° C. to produce both or either of carbon and carbon monoxide, said liquid organic compound consisting of carbon, hydrogen and oxygen atoms, and being selected from the group consisting of alcohols, phenols, hydroperoxides, aldehydes, ketones, carboxylic acids, esters and ethers, and said reducing atmosphere is formed or reinforced by both or either of carbon and carbon monoxide produced by the thermal decomposition of the liquid organic compound in the firing stage.

* * * * *